(12) United States Patent
Choi et al.

(10) Patent No.: US 7,925,148 B2
(45) Date of Patent: Apr. 12, 2011

(54) APPARATUS AND METHOD FOR COMPENSATING POSITION OF CAMERA LENS ACCORDING TO TEMPERATURE VARIATION

(75) Inventors: Hoseok Choi, Pyeongtaek-si (KR);
Gihoon Lee, Pyeongtaek-si (KR);
Jinsoo Park, Pyeongtaek-si (KR);
Mansung Kim, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 407 days.

(21) Appl. No.: 11/951,668

(22) Filed: Dec. 6, 2007

(65) Prior Publication Data
US 2008/0152334 A1   Jun. 26, 2008

(30) Foreign Application Priority Data
Dec. 7, 2006 (KR) .................. 10-2006-0123725

(51) Int. Cl.
*G03B 13/00* (2006.01)
(52) U.S. Cl. ............. 396/97; 396/231; 396/81; 348/345
(58) Field of Classification Search .............. 396/97
See application file for complete search history.

(56) References Cited

U.S. PATENT DOCUMENTS

| | | | | |
|---|---|---|---|---|
| 4,903,134 A | * | 2/1990 | Murashima et al. | 348/347 |
| 5,124,738 A | * | 6/1992 | Yamashita | 355/56 |
| 6,115,552 A | * | 9/2000 | Kaneda | 396/82 |
| 6,144,805 A | * | 11/2000 | Ogino | 396/81 |
| 6,344,930 B1 | * | 2/2002 | Kaneko et al. | 359/666 |
| 6,822,688 B2 | * | 11/2004 | Ohta | 348/349 |
| 7,411,624 B2 | * | 8/2008 | Konishi et al. | 348/345 |
| 7,574,126 B2 | * | 8/2009 | Honjo et al. | 396/97 |
| 2006/0008263 A1 | | 1/2006 | Kakiuchi | |

FOREIGN PATENT DOCUMENTS

| | | |
|---|---|---|
| CN | 1719329 A | 1/2006 |
| KR | 10-1996-0003365 B1 | 6/1999 |
| KR | 10-2004-0107560 A | 12/2004 |

OTHER PUBLICATIONS

"Stepper Motor Basics", solarbotics.net, obtained from http://web.archive.org/web/20040105044544/http://solarbotics.net/library/pdflib/pdf/motorbas.pdf; dated Jan. 5, 2004.*

* cited by examiner

*Primary Examiner* — W. B. Perkey
*Assistant Examiner* — Bret Adams
(74) *Attorney, Agent, or Firm* — Birch, Stewart, Kolasch & Birch, LLP

(57) ABSTRACT

This document relates to an apparatus and method for controlling a camera according to temperature. The apparatus according to an embodiment of this document may comprise a camera comprising lenses comprising a focus lens, an iris, a lens barrel, a motor drive for controlling positions of the lenses and the iris, and a CCD, a temperature sensor for measuring a temperature of the camera, memory for storing information about a relationship between temperatures and positions of the lenses, and a state of the camera, and a controller for controlling the camera to capture an image, measuring temperature variation between a current state and a previous state through the temperature sensor, calculating a position where the focus lens has been moved according to the temperature variation based on the relationship information of the temperatures and the positions of the lenses, and determining whether to compensate for the moved position.

14 Claims, 8 Drawing Sheets

FIG. 6(C)

Position #1

| -20 | -15 | -10 | -5 | 0 | 5 | 10 | 15 | 20 | 25 | 30 | 35 | 40 |
|---|---|---|---|---|---|---|---|---|---|---|---|---|
| -0.5 | -0.44 | -0.36 | -0.28 | -0.2 | -0.1 | 0.0 | 0.1 | 0.2 | 0.3 | 0.38 | 0.45 | 0.53 |

Position #2

| -20 | -15 | -10 | -5 | 0 | 5 | 10 | 15 | 20 | 25 | 30 | 35 | 40 |
|---|---|---|---|---|---|---|---|---|---|---|---|---|
| -0.55 | -0.46 | -0.38 | -0.29 | -0.2 | -0.1 | 0.0 | 0.12 | 0.21 | 0.31 | 0.39 | 0.47 | 0.56 |

APPARATUS AND METHOD FOR COMPENSATING POSITION OF CAMERA LENS ACCORDING TO TEMPERATURE VARIATION

This nonprovisional application claims priority under 35 U.S.C. §119(a) on Patent Application No. 10-2006-123725 filed in Republic of Korea on Dec. 7, 2006, the entire contents of which are hereby incorporated by reference.

BACKGROUND

1. Field

This document relates to an apparatus and method for controlling a camera according to temperature.

2. Related Art

In recent years, as the Digital Video Recorder (DVR) is commercialized, a number of monitoring cameras are installed at places requiring security as shown in FIG. 1. Monitoring images are captured by the cameras, and then transmitted to and recorded into the DVR at a remote place.

The monitoring cameras are generally installed at indoor or outdoor open places due to sensitive problems such as privacy. In particular, cameras operating outdoors are exposed to external temperature variation and thus have their operation and performance influenced by such temperature variation. This temperature variation particularly has a great influence on an optical system.

In this case, the length of a lens barrel for fixing or supporting a zoom lens, a focusing lens, etc., the position of lenses, the refractive index of the lenses, and so on are changed according to temperature. For example, as shown in FIG. 2, when temperature is lowed, the length of the lens barrel can be shortened. In the state where a desired subject is focused in manual focus mode, the focused position is changed as temperature is changed, so the desired subject may not be focused on.

Further, when temperature within a camera abruptly changes or is in an ultra-low temperature state, the camera may not perform a normal photographing operation. For example, when an internal temperature of a camera is in an ultra-low temperature state of −40 degrees Celsius, the performance of respective electronic components, equipments, and optical elements is degraded, hindering a normal photographing operation.

SUMMARY

Accordingly, this document has been made keeping in mind the above problems occurring in the related art, and an aspect of this document is to provide a method of normally operating a camera at very low temperature.

Another aspect of this document is to provide a method and apparatus for controlling a camera operation in response to temperature variation.

In an aspect, a method of controlling a camera according to temperature may comprise measuring temperature variation between a current state and a previous state, calculating a position where a camera lens has been moved according to the temperature variation, and determining whether to compensate for the moved position of the lens.

An apparatus for controlling a camera according to temperature may comprises a camera comprising lenses comprising a focus lens, an iris for controlling an amount of incident light, a lens barrel for supporting the lenses, a motor drive for controlling positions of the lenses and the iris, and a CCD, a temperature sensor for measuring a temperature of the camera, memory for storing information about a relationship between temperatures and positions of the lenses previous obtained through experiments or simulations, and a state of the camera, and a controller for controlling the camera to capture an image, measuring temperature variation between a current state and a previous state through the temperature sensor, calculating a position where the focus lens has been moved according to the temperature variation based on the relationship information of the temperatures and the positions of the lenses stored in the memory, and determining whether to compensate for the moved position of the focus lens.

BRIEF DESCRIPTION OF THE DRAWINGS

The implementation of this document will be described in detail with reference to the following drawings in which like numerals refer to like elements.

FIGS. 6A to 6C illustrate data regarding each position of the lens barrel and data regarding a change of each lens position depending on temperature variation.

DETAILED DESCRIPTION

Hereinafter, an implementation of this document will be described in detail with reference to the attached drawings.

Figure 1:
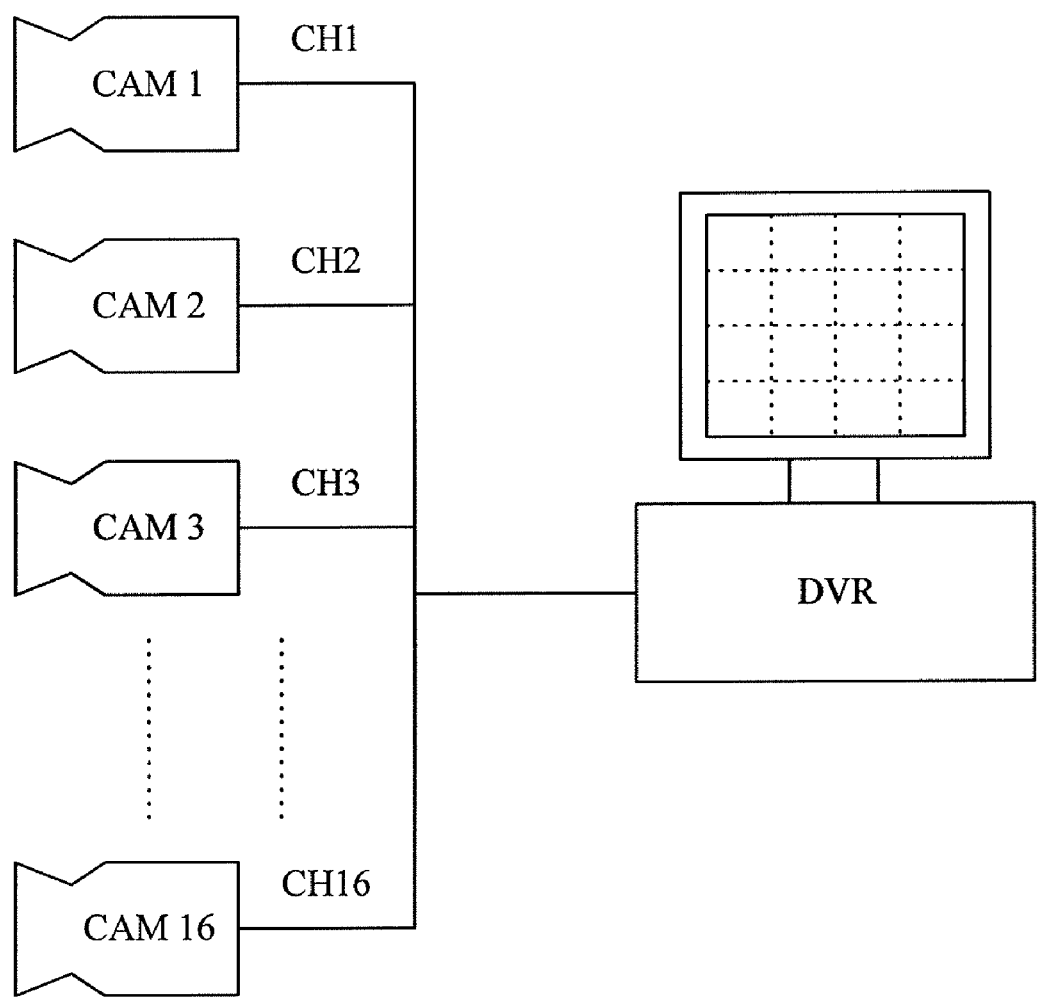
FIG. 1 is a view illustrating a state where a plurality of cameras are connected to a DVR.
Figure 2:
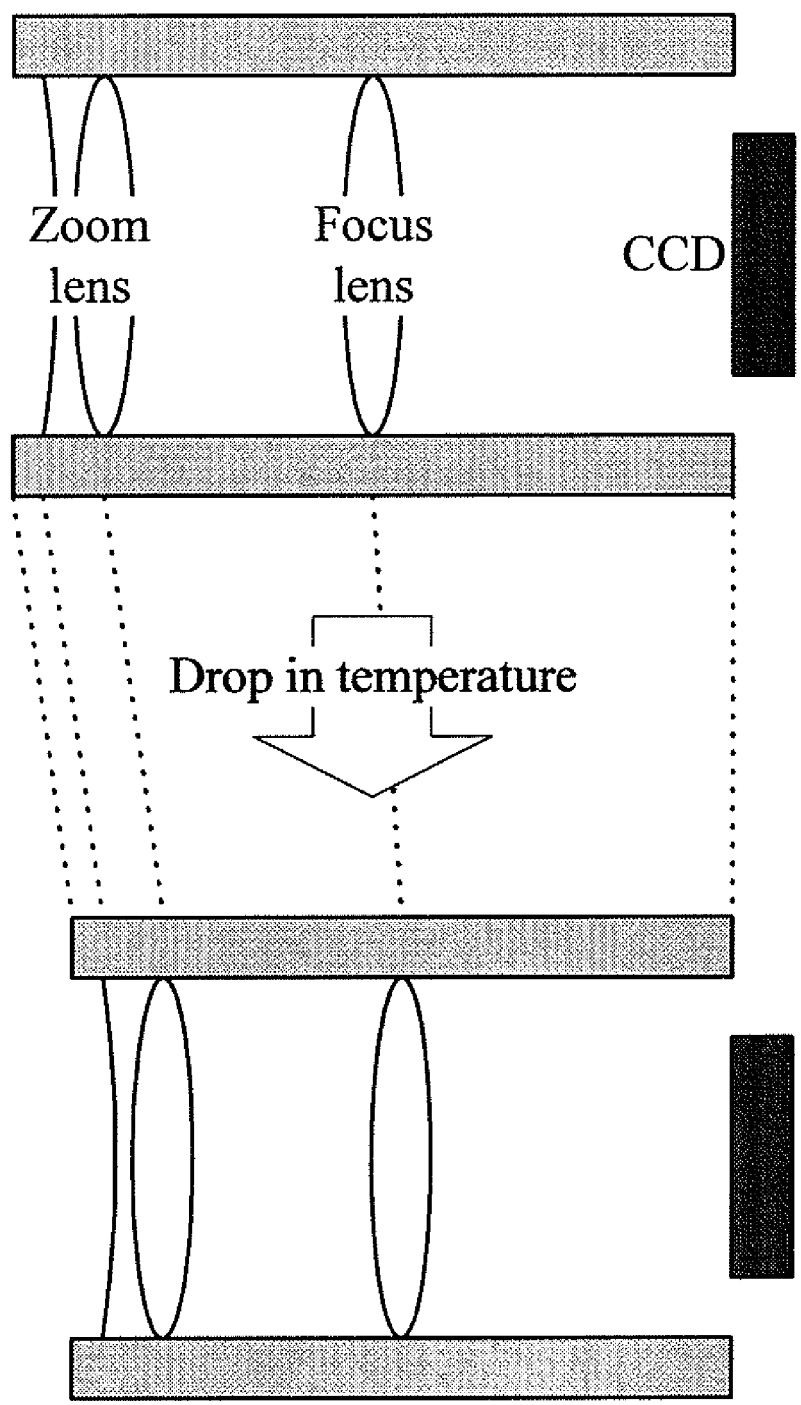
FIG. 2 is a view illustrating an example in which the length of the lens barrel and the position of the lens are changed according to temperature variation.
Figure 3:
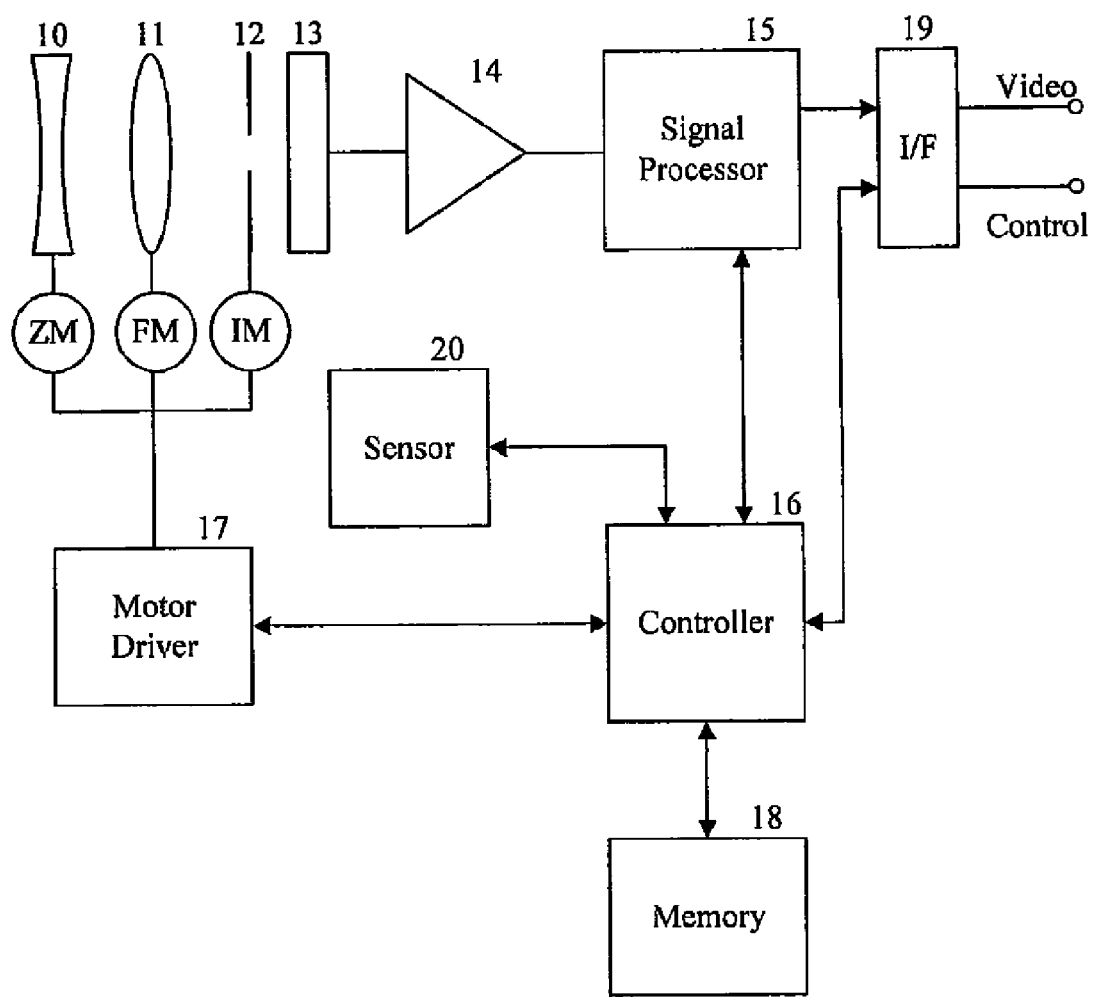
FIG. 3 shows a construction of a camera to which this document is applied.

FIG. 3 shows a construction of a camera to which this document is applied. For example, a monitoring camera connected to a DVR may comprise a zoom lens 10, a focus lens 11, an iris 12, a Charged Coupled Device (CCD) 13, an Automatic Gain Controller (AGC) 14, a signal processor 15, a controller 16, a motor driver 17, memory 18, an interface unit 19, and so on, and also comprise a temperature sensor 20 for sensing an internal temperature of the camera.

The memory 28 stores therein a reference temperature at which a camera photographing operation is not executed normally. The reference temperature may be decided by an experiment. When a current temperature within the camera, which is detected by the temperature sensor 20, is lower than the reference temperature, the controller 16 determines that the camera is unable to perform a normal photographing operation and thus executes an automatic warm-up operation in order to raise the internal temperature of the camera. This is described below in detail.

Figure 4:
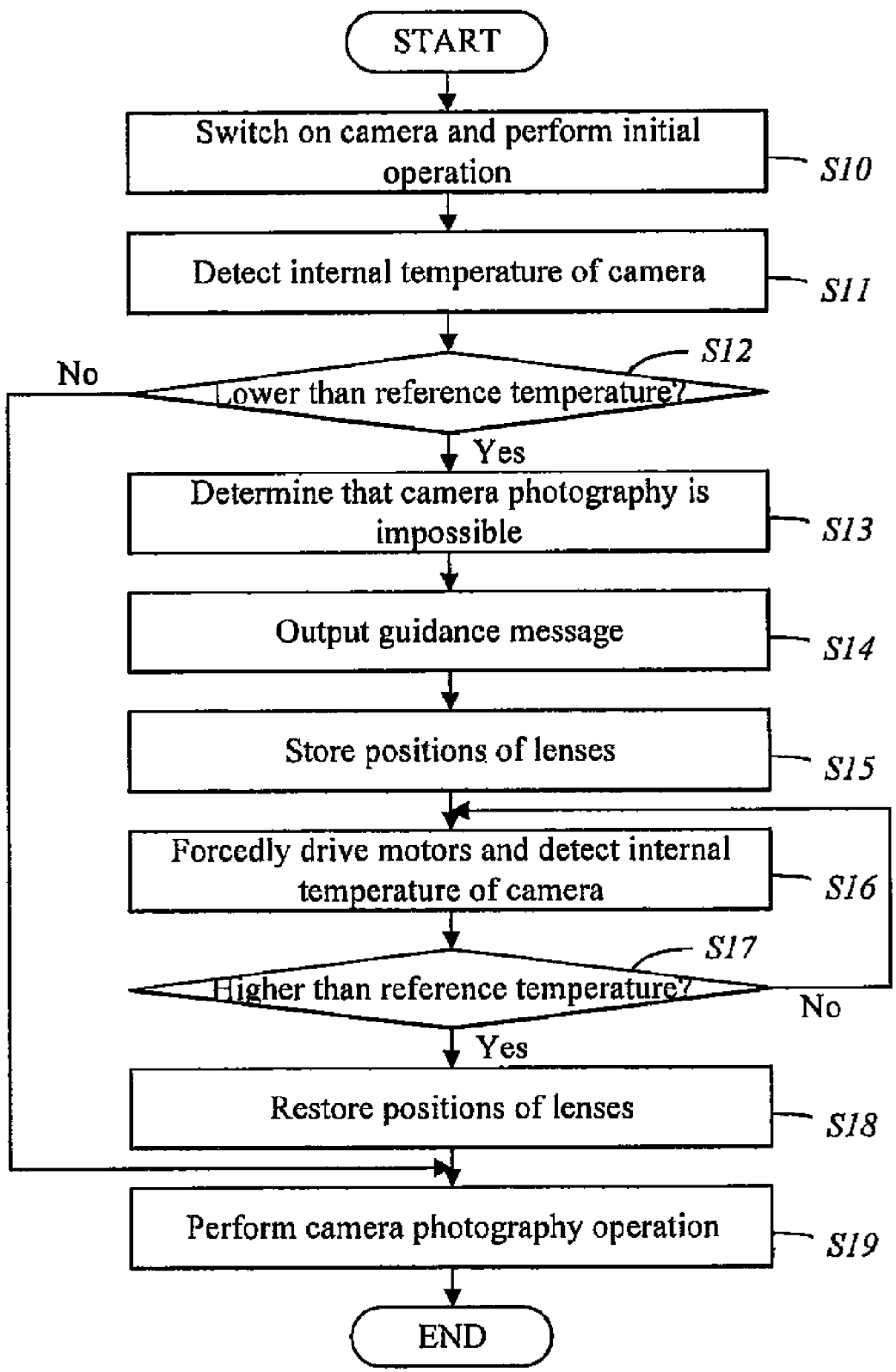
FIG. 4 is a flowchart illustrating a method of controlling a camera depending on temperature according to an embodiment of this document.

FIG. 4 is a flowchart illustrating a method of controlling a camera depending on temperature according to an embodiment of this document.

When the power of the camera is switched on, the controller 16 executes a series of initial operations so that respective circuit components and optical elements within the camera normally operate in step S10.

The controller 16 detects current temperature within the camera through the temperature sensor 20 in step S11 and then determines whether the detected current temperature is lower than a reference temperature stored in the memory 18 in step S12. For example, if the current temperature is −25 degrees Celsius and the reference temperature is −20 degrees Celsius, the controller 16 determines that normal photographing is impossible due to an ultra-low temperature state in step S13.

According to the determination result, the controller 16 controls the signal processor 15 not to output an unstable image that is abnormally captured and at the same time output an image of a guidance message, informing the automatic warm-up mode, in step S14.

The controller 16 detects the positions of the zoom lens 10 and the focus lens 11 and temporarily stores them in the memory 18 in step S15. The controller 16 controls the motor driver 17 to drive motors disposed within the camera and at the same time, monitors a current temperature detected by the temperature sensor 20 in step S16.

Figure 5:
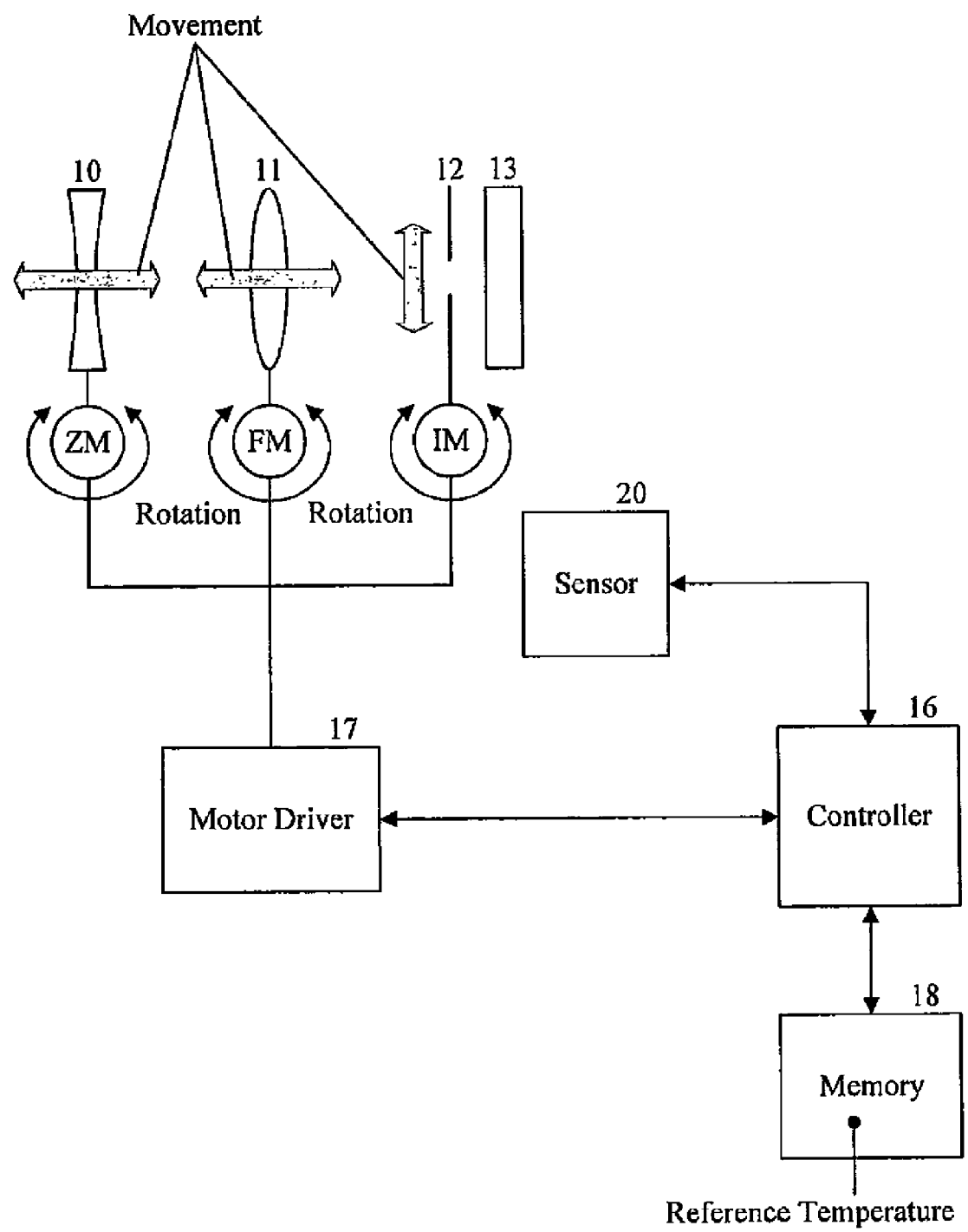
FIG. 5 illustrates an embodiment in which motors within the camera are rotated in order to perform a warm-up operation.

For example, as shown in FIG. 5, the controller 16 may execute an automatic warm-up operation for controlling the motor driver 17 to drive a zoom lens motor ZM, a focus lens motor FM, and/or an iris motor IM disposed within the camera in order to generate heat, and at the same time, determines whether a current temperature detected by the temperature sensor 20 is higher than the reference temperature stored in the memory 18 in step S17.

If, as a result of the determination in step S17, it is determined that the current temperature is identical to the reference temperature, the controller 16 reads the positions of the zoom lens and the focus lens, which are temporarily stored in the memory 18, and restores the positions of the zoom lens and the focus lens to their original positions in step S18.

The controller 16 controls the signal processor 15 to output a guidance message, informing the termination of the automatic warm-up operation, and then executes a normal camera photographing operation in step S19. Accordingly, the camera photographing operation can be prevented from being abnormally performed in an ultra-low temperature state and time to be taken for the camera to operate normally can be reduced.

Meanwhile, as mentioned earlier, when the length of the lens barrel is changed according to temperature variation, the positions of the zoom lens, the focus lens, and so on are changed. Due to this, a focus position in a manual focus mode can be changed and therefore a desired subject cannot be focused on.

Further, a focus depth, so-called the depth of focus is changed depending on a degree in which the iris is opened. If the iris is opened widely, the depth of focus becomes shallows. Thus, when the position of the focus lens is changed slightly, the lens may not be focused. When the iris is tightened strongly, the depth of focus is deep. Accordingly, although the position of the focus lens is changed a lot, the focus lens can be focused to some extent.

Furthermore, the focus position is changed greatly depending on a zoom state. For example, in a telescopic state (zoom-in) where a distant subject is enlarged, the focus position is changed greatly even when the position of the focus lens is changed slightly. In a wide-angle state (zoom-out) where subjects of a wide range are photographed, the focus lens is focused in a wide range (a range where the distance from the camera is close or distance) irrespective of the position change of the focus lens.

Therefore, in another embodiment of this document, the variation of the focus position according to temperature variation is corrected, and the state of the camera (that is, an iris value and/or a zoom state) may be taken into consideration additionally.

Figure 6A:
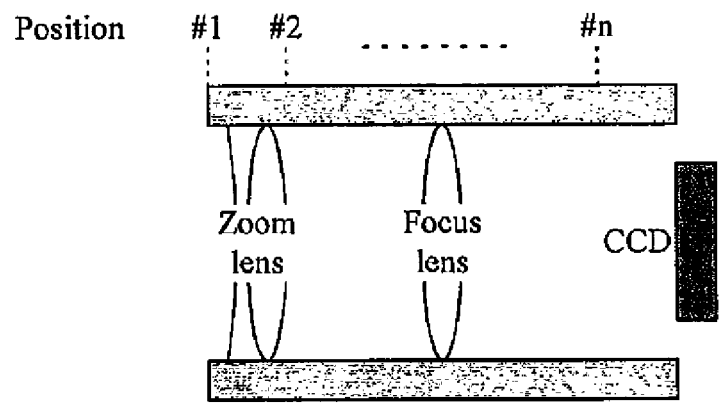
Figure 6B:
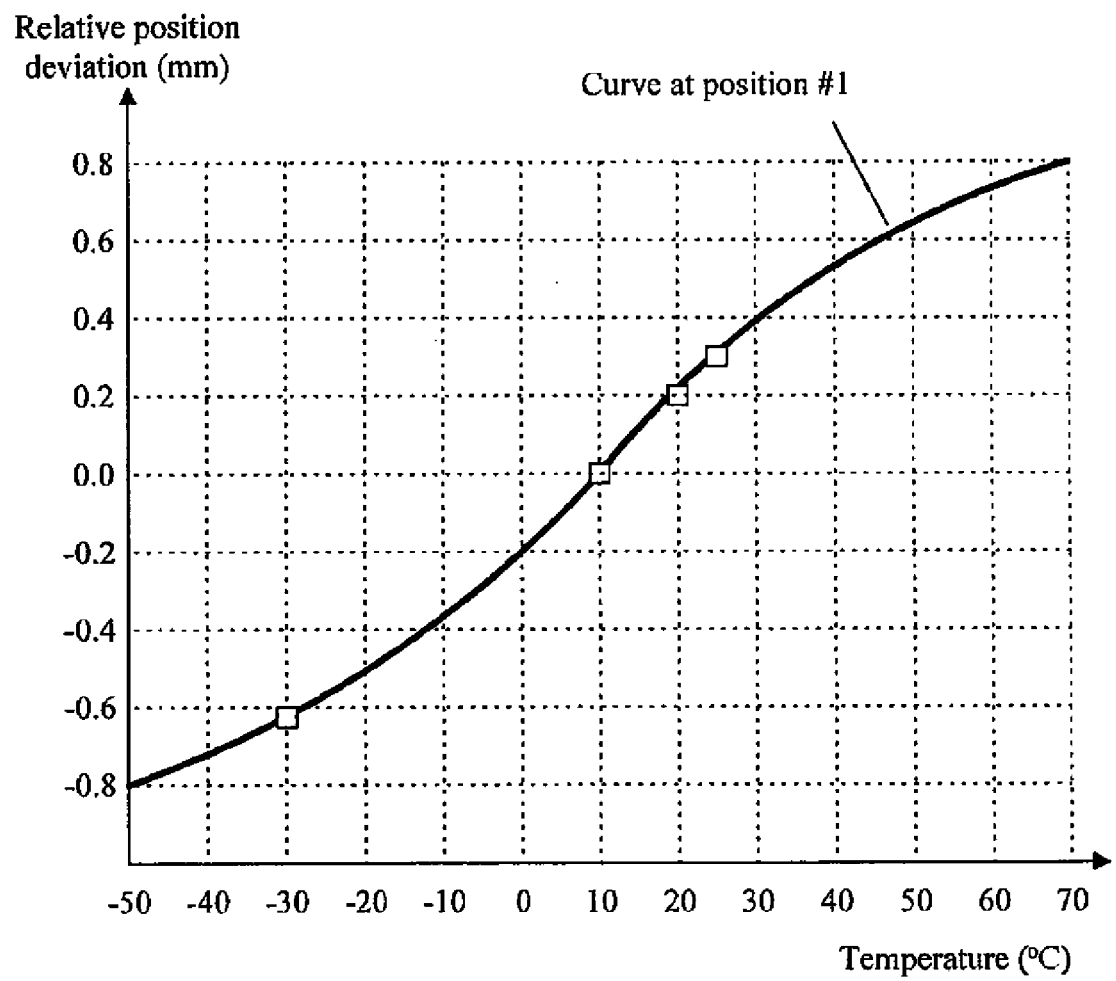

In order to correct the focus position according to temperature variation, a specific number "n" of positions are selected in the length direction of the lens barrel as shown in FIG. 6A. In this state, the amount of each position or a distance between each position and the CCD, which is changed depending on temperature, may be measured through experiments or calculated through simulations, and then stored in the memory. As shown in FIGS. 6B and 6C, variations of the distance (or movement values of corresponding positions) from a corresponding position to the CCD according to temperature variation on the basis of the reference temperature (for example, 10 degrees Celsius), with respect to the respective positions in the length direction of the lens barrel, can be managed.

Alternatively, only variations according to temperature variation with respect to only the farthest position from the CCD (variations of the distance between the farthest position and the CCD) are stored in the memory, and variations depending on temperature with respect to other positions can be derived according to the ratio of the distance between the CCD and a corresponding position and the distance between the CCD and the farthest position.

For reference, a focus distance may be decided by a distance between a subject and the lens and a distance between the lens and a position (CCD) at which an image is formed. The distance between the subject and the lens is much greater than the distance between the lens and the CCD. Accordingly, the movement of the lens according to temperature variation rarely has an effect on the distance between the subject and the lens, but has a much great influence on the distance between the lens and the CCD. Consequently, when considering the movement of the lens according to temperature variation, it is not a significant problem although only variations of the distance between the lens and the CCD are taken into consideration.

Thereafter, the position of the focus lens is corrected based on measured temperature variation, the position of the lens, a movement value of each position of the lens barrel depending on temperature (or variations of the distance between each position and the CCD), and so on.

When additionally considering a zoom state and/or an iris value, the position of the focus lens may be corrected or keeps intact. At this time, the depth of focus can be calculated depending on the zoom state and the iris value, and the focus lens that has been moved according to temperature variation can keep intact, or the focus lens can be shifted in an opposite direction as much as or less than the focus lens has been moved depending on the temperature variation.

For example, in the event that the depth of focus is deep since the iris is tightened strongly and, therefore, a movement position of the focus lens according to temperature variation falls within the calculated depth of focus, the focus lens may not be shifted or may be shifted in an opposite direction by a less displacement than the movement displacement according to the temperature variation. In contrast, in the event that the iris is opened widely or the depth of focus is shallow since the zoom state is in a telescopic state, the movement position of the focus lens according to temperature variation may be deviated from the depth of focus. Accordingly, the focus lens is shifted in an opposite direction by the same displacement as the movement displacement according to the temperature variation.

The embodiment may be applied to the camera described with reference to FIG. 3. The memory 18 of the camera in FIG. 3 stores therein information about the relationship between temperature and the position of the lens, and also stores information about a temperature, the position of the lens, the iris and the zoom state in a previous state, and so on. The controller 16 may measure a current temperature through the temperature sensor 20, calculate a difference between the temperature of the previous state, which is stored in the memory 18, and the measured current temperature, calculate a variation of the position of the lens depending on the temperature difference based on the information about the relationship, calculate the depth of focus based on information about the iris and/or the zoom state, compare a variation of the position of the lens with the depth of focus, and determine whether to compensate for the position of the focus lens or calculate a direction and amount in which the focus lens will be shifted.

The memory 18 may store therein a movement position at each temperature or a variation of a corresponding position according to temperature variation from a reference temperature with respect to each of a specific number of positions in the length direction of the lens barrel. The controller 16 calculates how much has a position "c" of the focus lens in the previous state been moved according to temperature variation measured through the temperature sensor 20. The controller 16 may search the information stored in the memory 18 for two positions "a" and "b" close to the position "c", and calculate a variation of the position "c" of the focus lens according to the measured temperature variation based on the information about two position variations according to the temperature variation with respect to the searched positions "a" and "b".

Alternatively, the memory 18 may store therein a position where the reference position has moved at each temperature or a variation of the reference position according to each temperature variation from the reference temperature with respect to only one reference position in the length direction of the lens barrel. The reference position may be managed as a reference distance from the CCD to a corresponding position. In this case, the controller 16 calculates how much has the position "c" been moved according to temperature variation measured through the temperature sensor 20 based on the relation between the position "c" (that is, the distance from the CCD to a corresponding position) of the focus lens in the previous state and the reference position (that is, the reference distance) stored in the memory 18 (that is, the ratio of the two distances from the CCD).

Thereafter, the controller 16 may control the motor driver 17 to shift the focus lens as much as the distance calculated using the above method in an opposite direction to a direction in which the focus lens has been moved.

In the event that the focus lens is moved in an opposite direction as much as the distance by which the focus lens has been moved according to temperature variation since not only the focus lens, but also other lenses are moved according to the temperature variation, the focus position at the CCD may be changed slightly. Thus, an amount for the focus lens to be shifted may be modified by taking the movement of other lenses into consideration.

Figure 7:
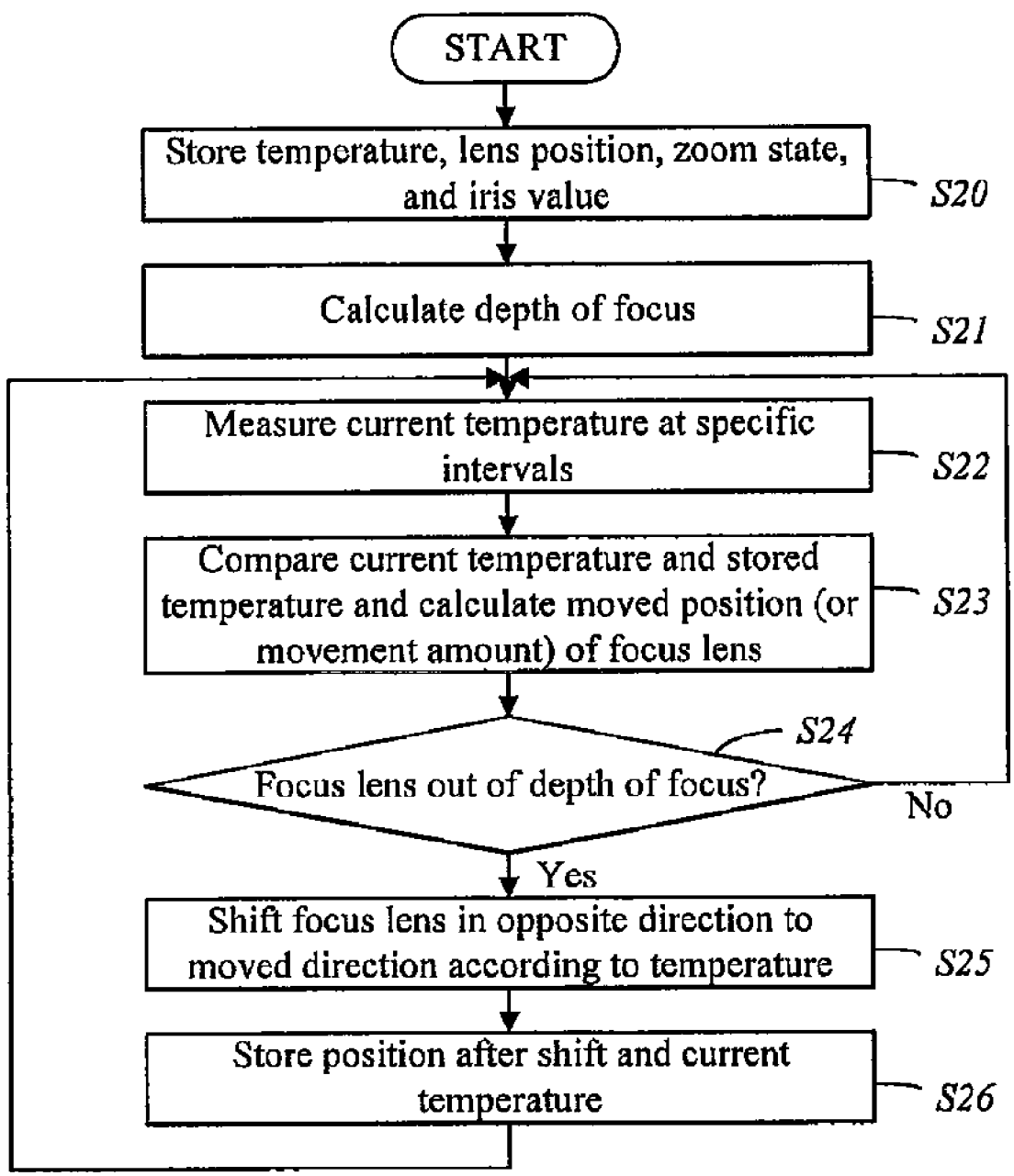
FIG. 7 is a flowchart illustrating a method of controlling a camera depending on temperature according to another embodiment of this document.

FIG. 7 is a flowchart illustrating a method of controlling a camera depending on temperature according to another embodiment of this document.

Information about the relationship between temperature and the positions of the lens, which are measured through experiments or calculated by simulations, are stored in the memory 18.

The controller 16 stores a current temperature, positions of respective lenses including a focus lens, a zoom state, an iris value, etc. in the memory 18 in step S20, and then calculates a range that is focused on the basis of the position of the focus lens (that is, the depth of focus) based on the above parameters in step S21.

The controller 16 measures a current temperature at specific intervals through the temperature sensor 20 in step S22, calculates a difference between a measured current temperature and the temperature of the previous state, which is stored in the memory 18, and calculates a position where the focus lens has been moved according to the calculated temperature difference (or a movement direction and the amount of movement) based on the relationship information between the temperature and the position of the lens stored in the memory 18 in step S23.

The controller 16 determines whether the position where the focus lens has been moved is located within the range of the depth of focus calculated in step S21, in step S24. If, as a result of the determination in step S24, it is determined that the focus lens falls within the depth of focus, the controller 16 repeats the steps S22 to S24.

If, as a result of the determination in step S24, it is determined that the focus lens is out of the depth of focus, the controller 16 controls the motor driver 17 to shift the focus lens as much as the distance calculated in step S23 in an opposite direction to a direction where the focus lens was moved in step S25, updates the temperature and the position of the lens stored in the memory 18 into the temperature measured in step S22 and the position after the focus lens was shifted, and then stores the updated information in the memory 18 in step S26.

Alternatively, the focus lens may be shifted in an opposite direction as much as a distance by which the focus lens has been moved irrespective of the depth of focus only when a difference between the current temperature measured in step S22 and the previous temperature stored in the memory 18 is greater than a specific temperature difference (for example, 10 degrees Celsius or higher).

Alternatively, the focus lens may be shifted in an opposite direction as much as a distance by which the focus lens has been moved irrespective of the depth of focus only when the movement amount of the focus lens calculated in step S23 is greater than a minimum movement amount of the focus lens, which can be driven through the motor drive 17.

As described above, although the length of the lens barrel, the position of the lens, etc. of the camera are changed according to temperature variation in the manual focus mode, a desired subject can be focused accurately.

Accordingly, the camera photographing operation can be prevented from being executed abnormally at very low temperature and time taken for a camera to operate normally can be saved. Further, a focus position, which is changed according to temperature variation, can be compensated for.

While this document has been described in connection with what is presently considered to be practical exemplary embodiments, it is to be understood that this document is not limited to the disclosed embodiments, but, on the contrary, is intended to cover various modifications and equivalent arrangements included within the spirit and scope of the appended claims.

What is claimed is:

1. A method of controlling a camera according to temperature, the method comprising:
    measuring a temperature variation between a current state and a previous state;
    calculating a position to which a camera lens has been moved according to the temperature variation; and
    determining whether to compensate for the moved position of the lens, wherein the determining step determines whether to compensate for the moved position of the lens based on whether the moved position of the lens according to the temperature variation falls within a depth of focus, wherein the position of the lens is not compensated for if the moved position of the lens according to the temperature variation falls within the depth of focus, wherein the lens is shifted in a direction opposite to a direction in which the lens has been moved as much as a movement distance calculated from the moved position and a position in the previous state if the moved position of the lens according to the temperature variation is out of the depth of focus, wherein the moved position of the lens is calculated based on information about a relationship between a temperature and a position of the lens comprising information about a displacement by which each reference position has been moved when a temperature is changed from a reference temperature to each of a specific number of other temperatures with respect to a specific number of the reference positions placed in a length direction of a lens barrel that supports the lens at the reference temperature, and the moved position of the lens is calculated based on a ratio of a distance between the position at which the lens was placed in the previous state and a CCD, and a distance between the reference position and the CCD, and the information about the movement displacement related to the reference position.

2. The method of claim 1, wherein the depth of focus is calculated based on an iris value and/or a zoom state of the camera in the previous state.

3. The method of claim 1, wherein the determining step determines whether to compensate for the moved position of the lens based on whether the temperature variation is greater than a specific temperature difference.

4. The method of claim 1, wherein the determining step determines whether to compensate for the moved position of the lens based on whether an amount by which the lens has been moved according to the temperature variation is greater than a minimum movement amount of the lens that can be driven.

5. The method of claim 1, wherein the information about the displacement comprises an amount of displacement and a movement direction.

6. The method of claim 1, wherein a position that is the farthest from the CCD is selected as the reference position.

7. A method of controlling a camera according to temperature, the method comprising:
measuring a temperature variation between a current state and a previous state;
calculating a position to which a camera lens has been moved according to the temperature variation; and
determining whether to compensate for the moved position of the lens,
wherein the determining step determines whether to compensate for the moved position of the lens based on whether the moved position of the lens according to the temperature variation falls within a depth of focus,
wherein the position of the lens is not compensated for if the moved position of the lens according to the temperature variation falls within the depth of focus,
wherein the lens is shifted in a direction opposite to a direction in which the lens has been moved as much as a movement distance calculated from the moved position and a position in the previous state if the moved position of the lens according to the temperature variation is out of the depth of focus,
wherein the moved position of the lens is calculated based on information about a relationship between a temperature and a position of the lens comprising information about a displacement by which each reference position has been moved when a temperature is changed from a reference temperature to each of a specific number of other temperatures with respect to a specific number of the reference positions placed in a length direction of a lens barrel that supports the lens at the reference temperature, and
the moved position of the lens is calculated based on information about a movement displacement related to two reference positions, which are the closest to a position where the lens was placed in the previous state.

8. The method of claim 7, wherein the information about the displacement comprises an amount of displacement and a movement direction.

9. An apparatus for controlling a camera according to temperature, the camera including lenses having a focus lens, an iris configured to control an amount of incident light, a lens barrel configured to support the lenses, a motor drive configured to control positions of the lenses and the iris, and a CCD, the apparatus comprising:
a temperature sensor configured to measure a temperature of the camera;
a memory configured to store information about a relationship between temperatures and positions of the lenses previously obtained, and a state of the camera; and
a controller configured to control the camera to capture an image, to measure a temperature variation between a current state and a previous state through the temperature sensor, to calculate a position to which the focus lens has been moved according to the temperature variation based on the relationship information of the temperatures and the positions of the lenses stored in the memory, and to determine whether to compensate for the moved position of the focus lens,
wherein the controller determines whether to compensate for the moved position of the focus lens based on whether the moved position of the lens according to the temperature variation falls within a depth of focus, which is calculated based on an iris value and/or a zoom state of the camera in the previous state and the controller does not compensate for the position of the focus lens when the moved position of the focus lens according to the temperature variation falls within the depth of focus, and moves the focus lens in an opposite direction to a direction in which the focus lens has been moved as much as a movement distance calculated from the moved position and a position in the previous state when the moved position of the focus lens according to the temperature variation is out of the depth of focus,
wherein the relationship information between the temperatures and the positions of the lenses comprises information about a displacement by which one reference position is changed when a temperature is changed from the reference temperature to each of a specific number of other temperatures, said one reference position being placed in a length direction of a lens barrel that supports the lens at the reference temperature, and
the controller calculates the moved position of the focus lens based on a ratio of a distance between the position at which the focus lens was placed in the previous state and the CCD, and a distance between the reference position and the CCD, and the information about the movement displacement related to the reference position.

10. The apparatus of claim 9, wherein the controller determines whether to compensate for the moved position of the focus lens based on whether the temperature variation is greater than a specific temperature difference or based on whether an amount by which the focus lens has been moved according to the temperature variation is greater than a minimum movement amount of the focus lens that can be driven through the motor drive.

11. The apparatus of claim 9, wherein the information about the displacement comprises an amount of displacement and a movement direction.

12. The apparatus of claim 9, wherein a position that is the farthest from the CCD is selected as the reference position.

13. An apparatus for controlling a camera according to temperature, the camera including lenses having a focus lens, an iris configured to control an amount of incident light, a lens barrel configured to support the lenses, a motor drive configured to control positions of the lenses and the iris, and a CCD, the apparatus comprising:
 a temperature sensor configured to measure a temperature of the camera;
 a memory configured to store information about a relationship between temperatures and positions of the lenses previously obtained, and a state of the camera; and
 a controller configured to control the camera to capture an image, to measure a temperature variation between a current state and a previous state through the temperature sensor, to calculate a position to which the focus lens has been moved according to the temperature variation based on the relationship information of the temperatures and the positions of the lenses stored in the memory, and to determine whether to compensate for the moved position of the focus lens,
 wherein the controller determines whether to compensate for the moved position of the focus lens based on whether the moved position of the lens according to the temperature variation falls within a depth of focus, which is calculated based on an iris value and/or a zoom state of the camera in the previous state and the controller does not compensate for the position of the focus lens when the moved position of the focus lens according to the temperature variation falls within the depth of focus, and moves the focus lens in an opposite direction to a direction in which the focus lens has been moved as much as a movement distance calculated from the moved position and a position in the previous state when the moved position of the focus lens according to the temperature variation is out of the depth of focus,
 wherein the relationship information between the temperatures and the positions of the lenses comprises information about a displacement by which each reference position has been moved when a temperature is changed from a reference temperature to each of a specific number of other temperatures with respect to a specific number of the reference positions placed in a length direction of the lens barrel at the reference temperature, and
 the controller calculates the moved position of the focus lens based on information about a movement displacement related to two reference positions, which are the closest to a position where the focus lens was placed in the previous state.

14. The apparatus of claim 13, wherein the information about the displacement comprises an amount of displacement and a movement direction.

* * * * *